(No Model.)

W. H. BAKER.
DRAFT EQUALIZER.

No. 275,322. Patented Apr. 3, 1883.

Witnesses.
Edwin L. Jewell
H. A. Toulmin

Inventor:
William H. Baker
C. M. Alexander.
Attorney

UNITED STATES PATENT OFFICE.

WILLIAM H. BAKER, OF OXFORD, MICHIGAN, ASSIGNOR OF SIX-TENTHS TO ANDREW LENT, DANIEL C. BARBER, AND TRUMAN H. RICE, OF SAME PLACE.

DRAFT-EQUALIZER.

SPECIFICATION forming part of Letters Patent No. 275,322, dated April 3, 1883.

Application filed October 13, 1882. (No model.)

*To all whom it may concern:*

Be it known that I, WILLIAM H. BAKER, of Oxford, in the county of Oakland, and in the State of Michigan, have invented certain new and useful Improvements in Draft-Equalizers; and I do hereby declare that the following is a full, clear, and exact description thereof, reference being had to the accompanying drawings, and to the letters of reference marked thereon, making a part of this specification.

This invention relates to certain improvements in draft-equalizers; and it has for its objects to provide for changing the draft from one horse to another quickly, and especially to divide the draft on one horse equally between the other two, if desirable to give an advantage to either.

My invention further has for its objects to provide an improved link and hook secured to the rear of the double-tree to connect said double-tree with the draft-bar or other attachment of the device to be drawn, the said improvement serving to bring all strains brought upon the equalizer in the same horizontal plane and in parallel lines. These objects I attain by the means illustrated in the accompanying drawings, in which—

Figure 1:
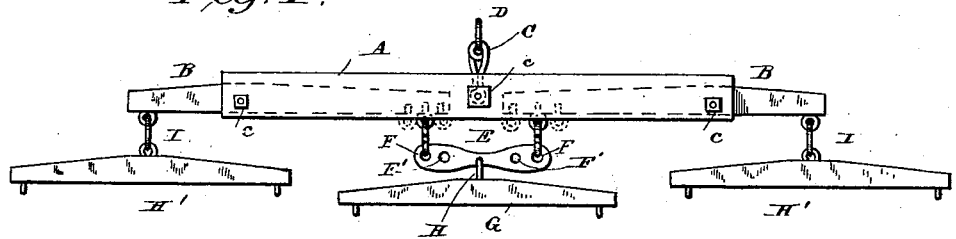
Figure 2:
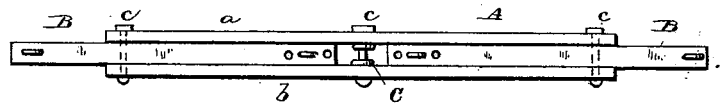
Figure 3:
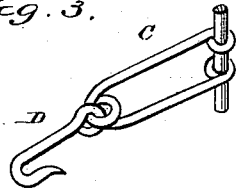

Figure 1 represents a plan view of my improved equalizer; Fig. 2, a front view of the double-tree, with the single-trees detached; and Fig. 3, a detached perspective view of the rear connection, by means of which the device is attached to the vehicle or implement to be drawn.

In the drawings, the letter A indicates a double-tree constructed in two parts, *a b*, connected together by means of bolts *c*, the bolts at the ends of said double-tree having pivoted to them the draft-equalizing levers B, the inner ends of which extend between the parts of the double-tree, the said inner ends forming the long arms of the levers. The central bolt has secured to it the rear connection, which consists of a bent link, C, looped at the ends to embrace the bolt, and at the bend to form an eye for the hook D, and will thus give to the link greater strength at its bends, which are usually its weakest points, and, should one of its parallel sides break, will hold under ordinary strains by the remaining side or portion of the link until the connection can be conveniently repaired. To the long arm of the levers is connected, by means of links, a bar, E, provided with a series of apertures, F F', by means of which the links may be secured, so as to shift the leverage, as may be desired. The inner apertures, F', serve to connect with both outer apertures of the arms B B, and thus lessen the draft upon the middle single-tree, G, and distribute it equally between the outer single-trees, H' H'; or one of the apertures, F, and the other, F', of the bar E may connect the middle and outer apertures of the long ends of the arms B, and by shifting the bar E its outer apertures may connect with either the middle or one of the inner and one of the outer apertures of the inner ends of the arms B.

It will thus be seen that a series of changes and combinations may be readily made to shift the draft from one animal to the other or others without altering the direct link-connections in parallel lines and in the same horizontal plane. This bar has secured to it a single-tree, G, by means of a link, H. To the short arms of the levers are secured the single-trees H' by means of links I.

It will also be perceived that, as constructed, the draft may be equally divided between three animals when the parts are in the position shown in Fig. 1, and that by shifting the central connection the draft may be made greater on either side, as may be desired.

Having thus described my invention, what I claim, and desire to secure by Letters Patent, is—

1. The combination, in a draft-equalizer, of the double-tree constructed in two parts, and the equalizing-levers pivoted between its ends and provided each with a series of apertures, and inner and outer eyebolts, with the outer single-trees secured respectively to the shorter arms of the levers and the inner single-tree, and draft-adjusting plate having a series of apertures, connected to the longer arms of said levers, the whole being constructed and arranged to bring the equalizing-bars, single-trees, draft-adjusting plate, and connecting-links in the same horizontal plane and in parallel vertical planes, substantially as described.

2. The link C, made of a single unwelded piece with a double loop at one end and single loops at each end, in combination with hook D and double-tree to adapt it to connect with any suitable implement, substantially as described, for the purpose specified.

In testimony whereof I affix my signature, in presence of two witnesses, this 20th day of September, 1882.

WILLIAM H. BAKER.

Witnesses:
 A. S. WARNER,
 G. S. CADOGAN.